(12) United States Patent
Shibuya et al.

(10) Patent No.: US 6,757,945 B2
(45) Date of Patent: Jul. 6, 2004

(54) MAT FASTENER

(75) Inventors: Tomio Shibuya, Tochigi (JP); Itsusi Kaseyama, Tochigi (JP); Yoshinobu Fukutomi, Tochigi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/017,094

(22) Filed: Dec. 14, 2001

(65) Prior Publication Data

US 2002/0078537 A1 Jun. 27, 2002

(30) Foreign Application Priority Data

Dec. 27, 2000 (JP) ........................................ 2000-397814

(51) Int. Cl.$^7$ ................................................ A44B 17/00
(52) U.S. Cl. ........................ 24/662; 24/114.12; 24/623; 16/8
(58) Field of Search ................................ 24/713.6, 662, 24/623, 459, 114.12, 593, 694; 16/2.1, 2.2, 4, 8; 411/339, 508

(56) References Cited

U.S. PATENT DOCUMENTS

| | | | | |
|---|---|---|---|---|
| 691,165 A | * | 1/1902 | McGill | ........................ 24/619 |
| 3,091,795 A | * | 6/1963 | Budwig | ........................ 16/2.1 |
| 3,653,353 A | * | 4/1972 | Davis | ........................ 114/115 |
| 4,363,580 A | * | 12/1982 | Bell | ........................ 411/15 |
| 4,562,624 A | * | 1/1986 | Kanzaka | ........................ 24/621 |
| 4,664,574 A | * | 5/1987 | Kasai | ........................ 411/508 |
| 4,878,792 A | * | 11/1989 | Frano | ........................ 411/339 |
| 5,069,586 A | * | 12/1991 | Casey | ........................ 411/339 |
| 5,093,957 A | * | 3/1992 | Do | ........................ 16/2.1 |
| 5,189,779 A | * | 3/1993 | Fishel et al. | ........................ 29/453 |
| 5,295,652 A | * | 3/1994 | Byrne | ........................ 248/635 |
| 5,511,283 A | * | 4/1996 | Hirose | ........................ 16/8 |
| 5,647,107 A | * | 7/1997 | Brewster | ........................ 24/713.6 |
| 5,659,924 A | * | 8/1997 | Gildersleeve | ........................ 16/2.1 |
| 5,775,859 A | * | 7/1998 | Anscher | ........................ 411/38 |
| 5,950,277 A | * | 9/1999 | Tallmadge et al. | ........................ 16/2.1 |
| 6,006,406 A | * | 12/1999 | Chung | ........................ 24/713.6 |
| 6,099,527 A | * | 8/2000 | Hochschuler et al. | ........................ 606/61 |
| 6,233,782 B1 | * | 5/2001 | Regele et al. | ........................ 16/2.1 |
| 6,238,765 B1 | * | 5/2001 | Bailey et al. | ........................ 428/95 |
| 6,381,806 B1 | * | 5/2002 | Stanesic et al. | ........................ 16/4 |
| 6,497,003 B2 | * | 12/2002 | Calabrese | ........................ 16/4 |

FOREIGN PATENT DOCUMENTS

| | | | | |
|---|---|---|---|---|
| DE | | 2200009 | | 7/1973 |
| DE | | 3632618 | | 4/1988 |
| EP | | 0188639 | | 7/1986 |
| GB | | 2134616 A | * | 8/1984 |
| JP | | 0080697 A1 | * | 6/1983 |
| JP | | 200027107 | | 1/2000 |

* cited by examiner

*Primary Examiner*—Anthony Knight
*Assistant Examiner*—Andre' L. Jackson
(74) *Attorney, Agent, or Firm*—Miles & Stockbridge P.C.

(57) ABSTRACT

A mat fastener has male and female grommets made of resin material. The female grommet includes an outer tube portion to be inserted into a hole in a mat; and a concave flange at the outer periphery of one end of the outer tube portion. The male grommet includes an inner tube portion to be inserted into the outer tube portion; and a concave flange at the outer periphery of one end of the inner tube portion. The tube portions are coupled to each other with the flanges of the grommets contacting opposite side surfaces of the mat around the mat hole, so that the mat is sandwiched between concavities of the flanges.

10 Claims, 5 Drawing Sheets

MAT FASTENER

BACKGROUND OF THE INVENTION

The present invention relates to a mat fastener that reinforces a mat hole and prevents tearing thereof. The mat hole is formed in a floor mat for automobiles and defines an anti-displacement hole.

It is known in the prior art to use a metal grommet (eyelet) type mat fastener. As a mat fastener for reinforcing and preventing tearing of an anti-displacement mounting hole formed in a floor mat for automobiles. In order to recycle or reuse the mat, it is required to remove such metal grommet type mat fasteners from the mat in advance. This is necessary because the metal grommet type mat fasteners might damage blades of a shredding machine during shredding the mat. Also, it is particularly difficult to remove the metal grommet type mat fasteners in advance. However, if the grommet is formed of a resin material, the mat can be advantageously shredded with such resin grommets mounted thereto.

The prior art teaches a mat fastener formed of a material free from any dioxin formation, such as polypropylene (PP). Typically, a mat for automobiles comprises an upper carpet layer made of olefin-based wool yarn and a lower rubber base layer. If a mat fastener is made of polypropylene being a similar olefin-based material, shredder dusts can be advantageously recycled without any material separation process. Unfortunately, among various resin materials, polypropylene has a lower elastic modulus and is subject to plastic deformation. This undesirably provides insufficient fastening force to the mat. Therefore, such a mat fastener has a remaining need for improving the fastening force to the mat. U.S. Pat. No. 5,511,283, and other prior art devices disclose various types of fasteners for use as a mat or carpet fastener. However, these types of fasteners do not include any arrangement for the recycling as described above, and have a remaining need for improving a force for clamping or sandwiching both surfaces of the mat or carpet.

SUMMARY OF THE PRESENT INVENTION

It is therefore an object of the present invention to provide a mat fastener having enhanced fastening force to a mat even if the fastener is made of a resin material, such as polypropylene, which has a low elastic modulus and is subject to plastic deformation.

In order to achieve the above object, according to the present invention, there is provided a mat fastener comprising a male grommet made of a resin material and a female grommet made of a resin material. The female grommet includes an outer tube portion having opposite open ends and is adapted to be inserted into a hole formed in a mat, and a flange which is formed at the outer periphery of one of the ends of the outer tube portion and is adapted to be in contact with one of the side surfaces of the mat. The male grommet includes an inner tube portion having opposite open ends and is adapted to be inserted into the outer tube portion, and a flange which is formed at the outer periphery of one of the ends of the inner tube portion of the female grommet and is adapted to be in contact with the other side surface of the mat. Each of the outer and inner tube portions is provided with engagement means for coupling the female and male grommets to each other. One of the flanges of the grommets is adapted to be brought into contact with one of the side surfaces of the mat around the mat hole, and the other flange of the grommets is brought into contact with the other side surface of the mat, so as to attach the mat fastener to the mat by sandwiching the mat between the flanges. The mat fastener as mentioned above is characterized in that one of the flanges of the male and female grommets has a larger outside dimension than that of the other thereof, and each of the flanges has an outer peripheral portion formed in a curved shape to be directed toward the mat to allow each of the flanges to be bitten into the mat in the state when the male and female grommets are coupled to each other by the engagement means.

According to the above construction, when the mat is sandwiched by the male and female grommet flanges, the outer peripheral portion of the smaller flange bites into one of the side surfaces of the mat, and the larger flange bites into the other side surface or opposite side surface of the mat at a radially outside position with respect to the position where the smaller flange bites into the mat. This provides enhanced fastening force to the mat. Thus, even if the fastener is made of a resin material, such as polypropylene, which has a low elastic modulus and is subject to plastic deformation, a high fastening force to a mat can be maintained.

Preferably, in the above mat fastener, the flange of the female grommet is formed as a circular plate having a larger diameter than that of a circular shape of the flange of the male. Further, the outer peripheral portion of the male grommet flange may be formed in a curved shape to allow the male grommet flange to bite into the mat toward the female grommet flange, and the outer peripheral portion of the female grommet flange may be formed in a curved shape to allow the female grommet flange to bite into the mat toward the male grommet flange from the opposite side of the mat at a radially outside position with respect to the position where the male grommet flange bites into the mat. This provides enhanced fastening force to the mat in addition, each of the flanges formed in a circular dome shape takes on enhanced strength with keeping adequate resilience.

Further, the above mat fastener may include an upper carpet layer and a lower rubber base layer. In this case, the male grommet may be disposed on the side of the carpet layer, and the female grommet may be disposed on the side of the base layer.

Further, the outer peripheral portion of the female flange preferably includes a plurality of protrusions formed in the circumferential direction of the outer peripheral portion with leaving a certain distance therebetween. The protrusion is adapted to protrude toward the base layer. This provides further enhanced fastening force.

Preferably, in the above mat fastener, at least one of the female and male grommet flanges includes a pin capable of biting into the mat to prevent relative rotation between the outer and inner tube portions.

BRIEF DESCRIPTION OF THE ACCOMPANYING DRAWINGS

With reference to the drawings identified below, an embodiment of the present invention will now be described.

DETAILED DESCRIPTION OF THE PREFERRED EMBODIMENT

Figure 1:
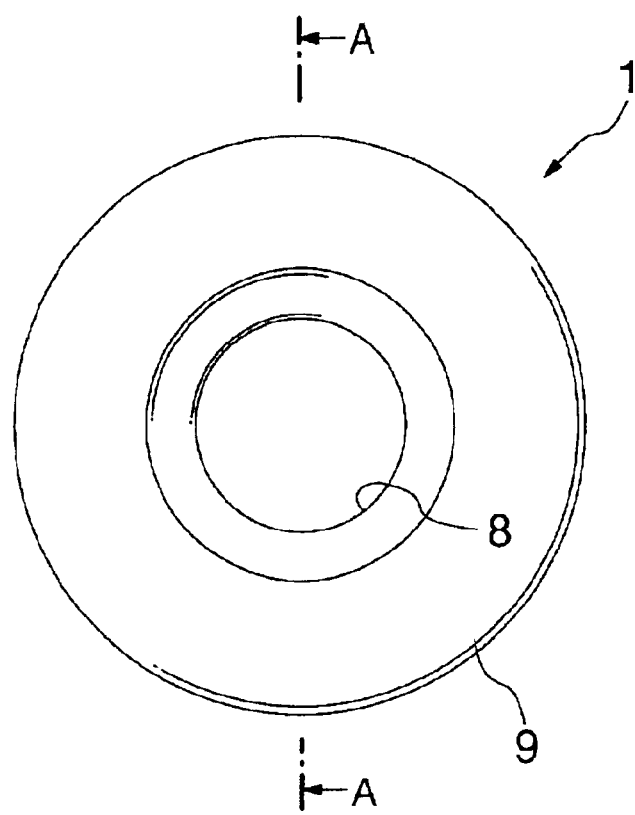
FIG. 1 is a plan view of a male grommet of a mat fastener of the present invention.
Figure 2:
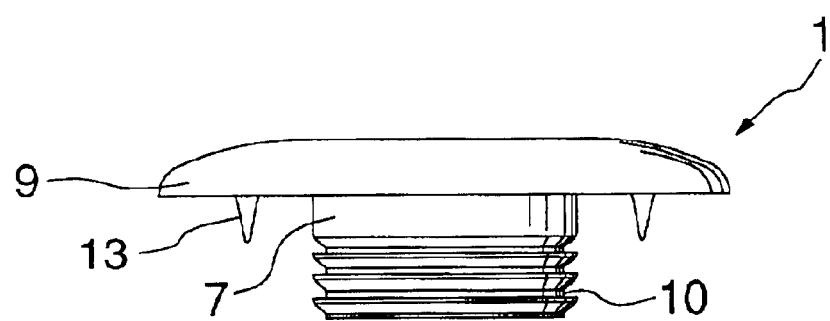
FIG. 2 is a side elevational view of the male grommet in FIG. 1.
Figure 3:
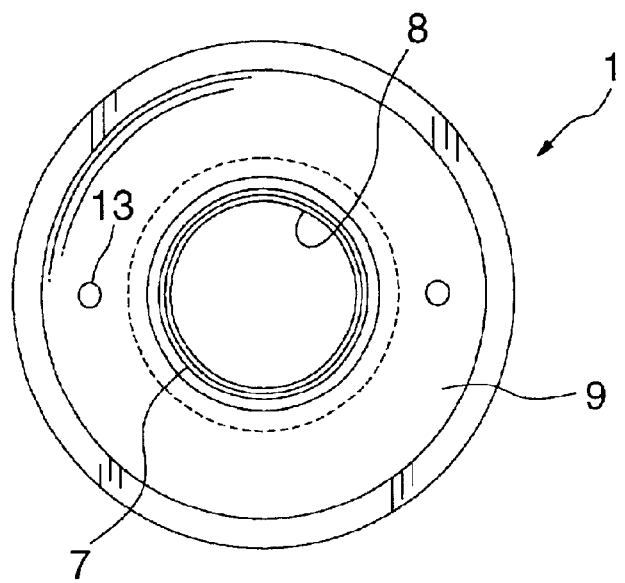
FIG. 3 is a bottom view of the male grommet in FIG. 1.
Figure 4:
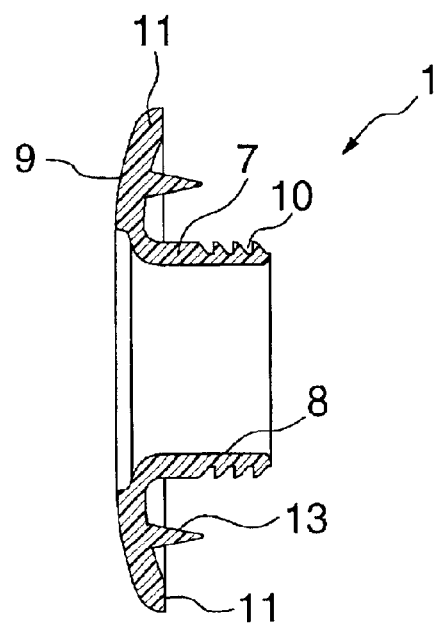
FIG. 4 is a sectional view of the male grommet taken along the line A—A of FIG. 1.
Figure 5:
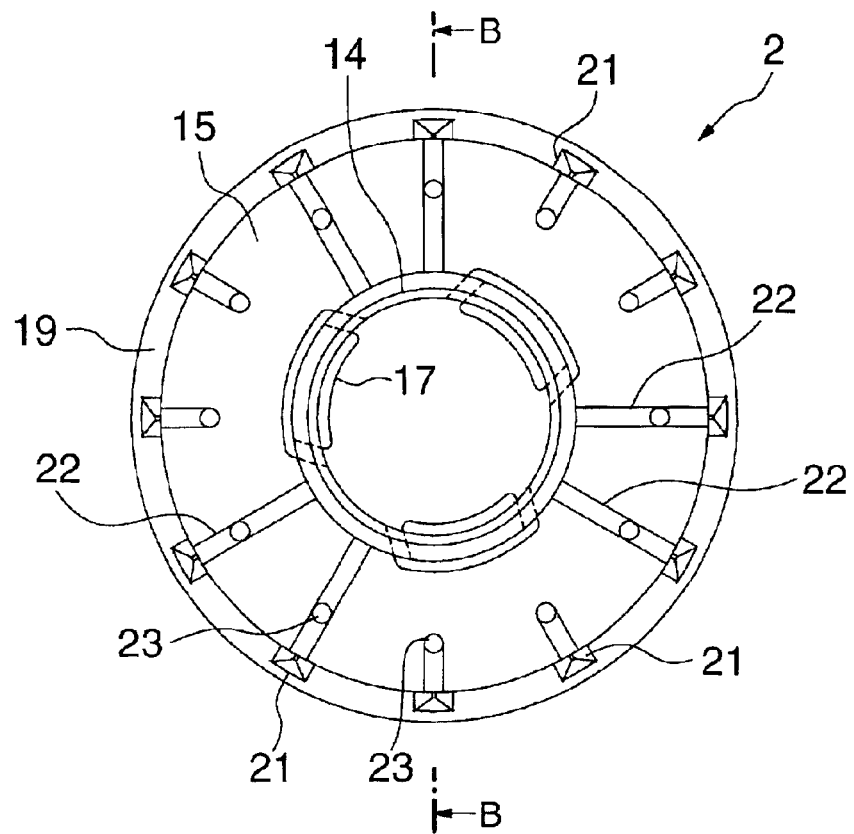
FIG. 5 is a plan view of a female grommet of a mat fastener of the present invention.
Figure 6:
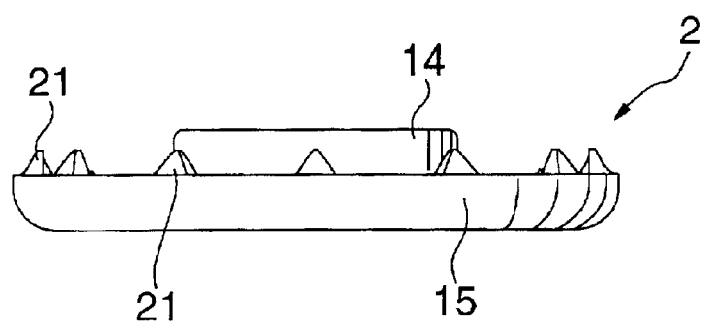
FIG. 6 is a side elevational view of the female grommet in FIG. 5.
Figure 7:
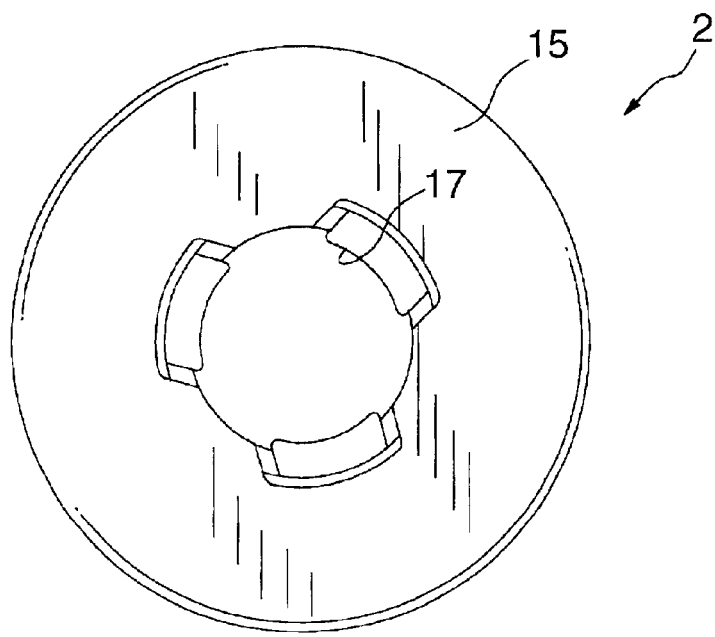
FIG. 7 is a bottom view of the female grommet in FIG. 5.
Figure 8:
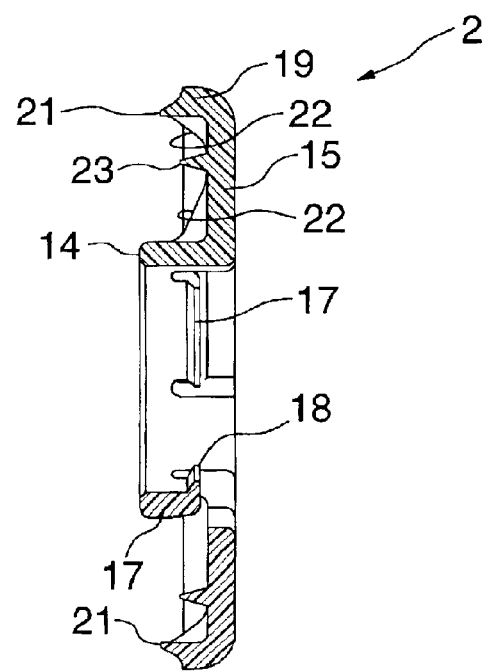
FIG. 8 is a sectional view of the female grommet taken along the line B—B of FIG. 5.
Figure 9:
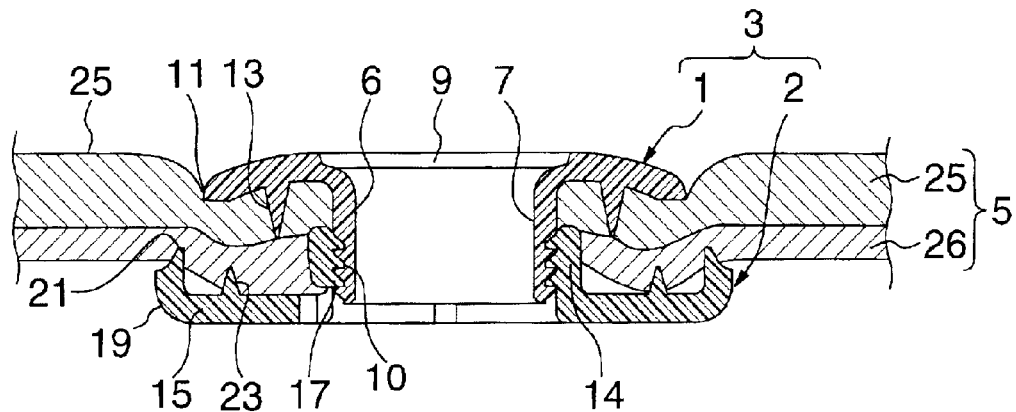
FIG. 9 is a sectional view showing the state when a mat fastener according to the present invention is mounted on a mat having a large thickness.
Figure 10:
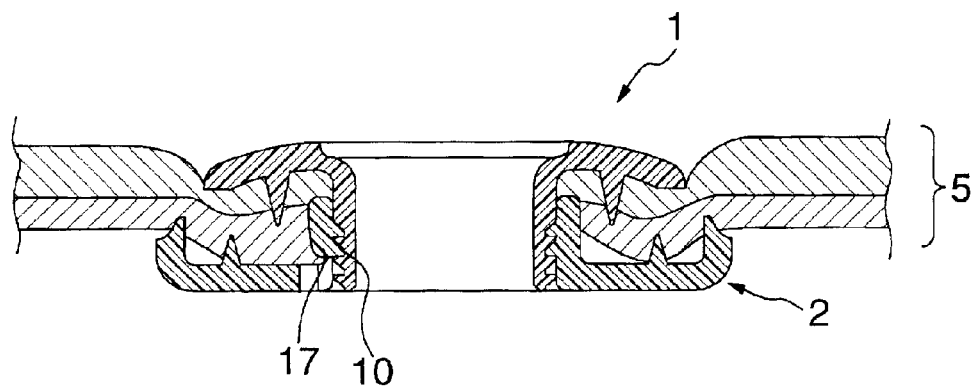
FIG. 10 is a sectional view showing the state when a mat fastener according to the present invention is mounted on a mat having a smaller thickness.
Figure 11:
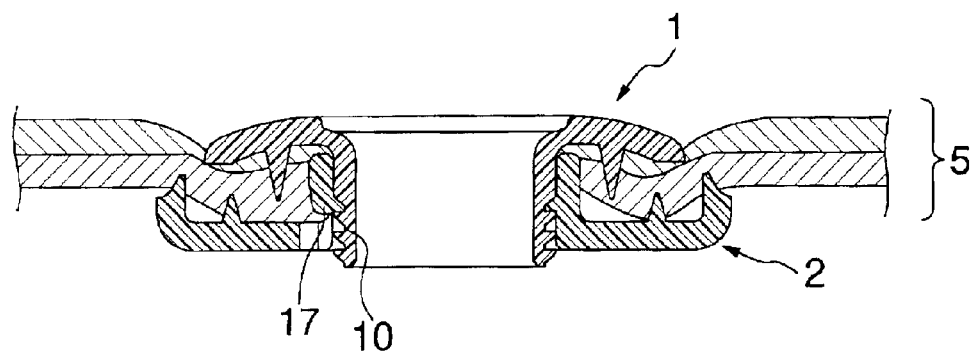
FIG. 11 is a sectional view showing the state when a mat fastener according to the present invention is mounted on a mat having still smaller thickness.

A mat fastener according to the present invention having a male grommet 1 made of a synthetic resin material is shown in FIGS. 1 to 4, and a female grommet 2 made of a synthetic resin material is shown in FIGS. 5 to 8. FIG. 9 shows the state when a mat fastener 3 composed of the male grommet 1 and the female grommet 2 is mounted for reinforcing an anti-displacement mounting hole 6 and preventing displacement of a mat 5. In FIG. 9, the male and female grommets 1 and 2 are disposed on the front and back surfaces of the mat 5, respectively, to clamp or sandwich the mat 5 therebetween. However, It is apparent that the two grommets 1 and 2 may be reversely arranged. As shown in the drawings, this embodiment is explicatively described on the assumption that the male grommet 1 is disposed on the front surface of the mat 5 and the female grommet 2 is disposed on the back surface of the mat 5. FIGS. 10 and 11 show the state when the fastener is attached to mats 5 each having a different thickness. This mat is fixed to a floor of an automobile by inserting or fitting a pin (not shown) mounted on the floor into the mat fastener 3. The details of the male grommet 1 and the female grommet 2 are described below.

In FIGS. 1 to 4, the male grommet 1 may be integrally molded of a resin material, such as polypropylene, which has a low elastic modulus and is subject to plastic deformation. The male grommet 1 includes an inner tube portion 7 having opposite open ends and serving as inner tube to be inserted into the outer tube portion of the female grommet, and a flange 9 formed at the outer periphery of one of the ends of the inner tube portion 7 and adapted to be in contact with one of the side surfaces of the mat. As shown, the inner tube portion 7 projects axially beyond the flange 9, and the flange 9 has an annular concavity surrounding the inner tube portion 7. The inner tube portion 7 has relatively short axial length similar to the thickness of the mat The outer peripheral surface of the inner tube portion 7 is provided with annular grooves 10 having a plurality of steps, with three steps being shown, to couple the male and female grommets to each other so as to serve as engagement means. Each of the grooves 10 has a configuration for permitting easy-insertion and resistance against pulling-out. The inner tube portion 7 is formed in a hollow body having an inner diameter which allows a pin (not shown) mounted on a floor of an automobile to be inserted therein. The flange 9 is formed in a circular plate having a given outside dimension to be in contact with one of the side surface of the mat around the anti-displacement mounting hole 6. The outer peripheral portion 11 of the flange 9 is formed in a curved shape to be directed toward the mat so as to allow the flange 9 to bite into the mat surface in the state when the male and female grommets are coupled to each other. This curved shape provides a dome shape in the flange 9. Thus, even if the flange 9 is made of a material which has a low elastic modulus and is subject to plastic deformation, the flange 9 can have enhanced strength with keeping adequate resilience. A plurality (two in this embodiment) of pins 13 is formed (in the diametrical direction of the flange in this embodiment) on the surface of the flange 9 to be in contact with the mat to prevent any rotation of the male grommet 1.

In FIGS. 5 to 8, the female grommet 2 may be integrally molded with a resin material, such as polypropylene, which has a low elastic modulus and is subject to plastic deformation. The female grommet 2 includes an outer tube portion 14 having opposite open ends. The outer tube portion 14 is adapted to be inserted into the anti-displacement mounting hole 6 of the mat and is formed in a hollow body capable of receiving the inner tube portion 7 of the male grommet 1 to serve as an outer tube. The female grommet 2 further includes a flange 15 which is formed at the outer periphery of one of the ends of the outer tube portion and is adapted to be in contact with the other side surface of the mat. As shown, the outer tube portion 14 projects axially beyond the flange 15, and the flange 15 has an annular concavity surrounding the outer tube portion 14. As long as the outer tube portion can reliably receive the inner tube portion 7, it is desirable that the outer tube portion 14 is designed to have the shortest axial length. The outer diameter of the outer tube portion 14 is formed to allow the outer tube portion to be inserted into the mounting hole of the mat, and the inner diameter of the outer tube portion 14 is formed to allow the inner tube portion 7 of the male grommet to be readily inserted thereinto and to avoid insufficient fastening after insertion. A resilient engagement pawl as the engagement means for coupling the male and female grommets 1 and 2 to each other is formed on the inner surface of the outer tube portion 14 adjacent to the flange 15. While the engagement pawl 17 may be provided in any number, this embodiment includes three engagement pawls along the inner peripheral surface of the outer tube portion 14 at even intervals. Each of the engagement pawls 17 is engaged with a groove 10 on the inner tube portion 7 of the male grommet 1. Each of the engagement pawls 17 is formed in a resiliently bendable configuration for allowing the inner tube portion 7 to be inserted therein and to be engaged with a groove 10 so as to prevent the movement in the pulling-out direction of the inner tube portion 7. As shown at the lower portion of the sectional view in FIG. 8, in each configuration of the engagement pawls 17 of this embodiment, the front edge 18 thereof extends in the inward direction of the outer tube portion 14, and slightly inclines toward the insertion direction of the inner tube 7. Each of the engagement pawls 17 has resiliency for bending radially outward within the outer tube portion 14. Thus, the front edge 18 is bent radially outward by inserting the inner tube portion 7, and then resiliently engaged with a groove 10 of the inner tube portion 7.

The flange 15 is formed in a circular plate having a given outside dimension to be in contact with the opposite side surface of the mat with respect to the flange 9 of the male grommet 1. The flange 15 is a larger diameter than that of the flange 9. The outer peripheral portion 19 of the flange 15 is formed in a curved shape to be directed toward the mat so as to allow the flange 15 to be bitten into the mat 5 at a radially outward position with respect to the position where the male grommet is bitten into the mat in the state when the male and female grommets 1 and 2 are coupled to each other. As with the male grommet flange 9, this curved shape provides a dome shape in the flange 15. Thus, even if the flange 15 is made of a material, such as polypropylene, which has a low elastic modulus and is subject to plastic deformation, the flange 15 can have enhanced strength with keeping adequate resilience.

Further, a plurality (twelve in this embodiment) of triangular protrusions 21 are formed on the outer peripheral portion 19 of the flange 15 in the circumferential direction of the outer peripheral portion 19 with leaving a certain distance therebetween. The triangular protrusions 21 bite into the mat. This provides enhanced fastening force to the mat. Further, each surface of the triangular protrusions 21 and each surface between the triangular protrusions 21 are brought into contact with the mat. This provides increased contact surface area in the outer peripheral portion has and enhanced engagement force. Furthermore, the flange 15 is formed with a plurality (three pairs or six in this embodiment) of ribs 22 extending radially (in the circumferential at even interval in this embodiment) to maintain high strength of the flange 15. In addition to the triangular protrusions 21 of the outer peripheral portion 19, the flange 15 is formed with a plurality (twelve corresponding to the number of the protrusions 21 in this embodiment) of pins 23 to be bitten into the mat at the radially inward position of the flange 15 to prevent relative rotation of the female grommet 2 to the mat.

FIG. 9 shows the state when the mat fastener 3 composed of the male and female grommets 1 and 2 having the aforementioned construction is mounted on the mat. In FIG. 9, the mat 5 is used as a floor mat of an automobile. For example, the mat 5 comprises an upper carpet layer 25 made of olefin-based wool yam and a lower rubber base layer 26. This embodiment will be explicatively described on the assumption that the male grommet 1 is disposed on the side of the carpet layer 25, and the female grommet 2 is disposed on the side of the base layer 26.

For example, in order to attach the mat fastener 3 to the mat 5, the outer tube portion 14 of the female grommet 2 is inserted into the mounting hole 6 from the side of the base layer 26 of the mat 5, and then the flange 15 is kept in contact with the base layer. In this state, the inner tube portion of the male grommet 1 is manually inserted into the outer tube portion 14, and the flange 9 is brought into contact with the carpet layer 25 while a groove 10 is engaged with an engagement pawl 17 of the outer tube portion 14. Then, the male grommet 1 is strongly pushed toward the female grommet 2 to sandwich the mat 5 between the flanges 9 and 15. Thus, the mat fastener 3 is mounted on the mat 5 with the mat sandwiched between the concavities of the flanges. Since the engagement between the engagement paws 17 of the outer tube: portion 14 and given grooves 10 is maintained, the mat fastener 3 is firmly fastened. In this fastened state, the outer peripheral portion 11 of the male grommet flange 9 is bitten into the carpet layer 25 of the mat 5. Further, the outer peripheral portion 19 of the female grommet flange 15 having a larger diameter than that of the male grommet flange 9 and the triangular protrusions 21 bite into the base layer 26 at the outside position with respect to the outer peripheral portion of the male grommet flange 9. Thus, as seen from the mat shape shown by the sectional view in FIG. 9, in which a portion of the mat is received within the concavities of the grommet flanges, the mat fastener firmly bites into the mat, and is held to the mat 5 with high fastening force. By virtue of this bite, the mat fastener 3 can deal reliably with a force acting to displace the mat right and left after attaching the mat to the floor of the automobile. Thus, the mat fastener 3 can avoid dropping off from the anti-displacement mounting hole 6. The pins 13 of the male grommet flange 9 and the pins 23 of the female grommet flange 15 also bite into the mat to prevent relative rotation between the inner and outer tube portions 7 and 14 so as to avoid their disengagement.

The male grommet inner tube portion 7 including the grooves 10 forming the plurality of steps allows the mat fastener 3 to be applied to various mats having different thicknesses. FIG. 9 shows the state when the mat fastener 3 is mounted on a mat having the largest thickness. FIG. 10 shows the state when the mat fastener 3 is mounted on a mat having an intermediate thickness. FIG. 11 shows the state when the mat fastener 3 is mounted on a mat having the smallest thickness. The engagement pawls and engagement grooves serving as the engagement means may be selectively arranged in either the male grommet or the female grommet as long as the engagement means functions to couple the male and female grommets to each other. Further, any other suitable construction capable of coupling the male and female grommets to each other may be used as the engagement means. Furthermore, the male and female grommet flanges may be designed in any suitable size or outside dimension for allowing these flanges to be engaged with or bitten into the mat at different positions. Moreover, the pins provided on the flanges are optional, and may be provided only on either one of the flanges or may not be provided.

In general, the above identified embodiments are not to be construed as limiting the breadth of the present invention. It will be understood that modifications or other alternative constructions may become apparent within the scope of the invention as defined in the appended claims.

What is claimed is:

1. A mat fastener for connection to a floor mat of an automobile comprising:
   a. a male grommet made of a resin material;
   b. a female grommet made of a resin material;
   c. the female grommet having an outer tube portion having opposite open ends and adapted to be inserted into a hole formed in the floor mat;
   d. the female grommet having a flange formed at an outer periphery of one of the ends of the outer tube portion and being adapted to be in contact with one side surface of the mat, the outer tube portion projecting axially beyond the flange of the female grommet for insertion into the hole formed in the floor mat;
   e. the male grommet having an inner tube portion having opposite open ends and adapted to be inserted into the out r tube portion of the female grommet and a flange formed at an outer periphery of one of the ends of the inner tube portion;
   f. the flang of the male grommet adapted to be in contact with another side surface of the mat; wherein:
   g. each of the outer and inner tube portions is provided with an engagement means for coupling the female and male grommets to each other so that, upon engagement thereof, one of the flanges of the grommets is adapted to be brought into contact with one of the side surfaces of the mat around the mat hole and the other flange of the grommets is adapted to be brought into contact with the other side surface of the mat, whereby the mat fastener is fastened to the mat with the mat sandwiched between the flanges;

h. one of the flanges of the male and female grommets has a larger outside dimension than that of the other thereof;

i. each of the flanges has an outer peripheral portion formed in a curve shape to be directed toward the mat to allow each of the flanges to bite into the mat when the male and female grommets are coupled to each other by the engagement means;

j. the flange of the female grommet has an annular concavity surrounding the tube portion of the female grommet; and k. wherein the flange of the female grommet has a plurality of radial, circumferentially spaced stiffening ribs formed in the concavity between the tube portion and the outer peripheral portion of the female grommet.

2. The mat fastener claimed in claim 1, wherein the stiffening ribs support a plurality of protrusions to bite into the mat toward the male grommet flange.

3. The mat fastener claimed in claim 1, wherein the outer peripheral portion of the flange of the female grommet has a plurality of circumferentially spaced protrusions to bite into the mat toward the male grommet flange.

4. In combination, a mat fastener and a floor mat with a hole therethrough for receiving the mat fastener, wherein the mat fastener comprises:

a female grommet having a flange engaging one side of the mat and a tube projecting from the flange and inserted in the hole of the mat, the flange having an annular concavity therein surrounding the tube and facing said one side of the mat; and a male grommet having a flange engaging an opposite side of the mat and a tube projecting from the flange and inserted into the tube of the female grommet, and wherein:

the grommets have engagement means for retaining the tube of the male grommet in the tube of the female grommet, and a portion of the mat is received in the concavity of the female grommet.

5. The combination of claim 4, wherein the female grommet has a plurality of protrusions that bite into the mat.

6. The combination of claim 4, wherein the flange of the male grommet has an annular concavity therein surrounding the tube of the male grommet and facing said opposite side of the mat, and wherein a portion of the mat is also received in the concavity of the male grommet.

7. The combination of claim 4, wherein at least one of the female and male grommet flanges includes a pin that bites into the mat to prevent relative rotation between the outer and inner tubes.

8. The combination of claim 4, wherein the flange of the female grommet has a plurality of radial, circumferentially spaced stiffening ribs formed in the concavity between the tube and an outer peripheral portion of the flange of the female grommet.

9. The combination of claim 8, wherein the stiffening ribs support a plurality of protrusions that bite into the mat toward the male grommet flange.

10. The combination of claim 8, wherein the outer peripheral portion of the flange of the female grommet has a plurality of circumferentially spaced protrusions that bite into the mat toward the male grommet flange.

* * * * *